United States Patent
Dickie et al.

[15] 3,699,185
[45] Oct. 17, 1972

[54] RUBBER-MODIFIED ACRYLIC COPOLYMER THERMOSET

[72] Inventors: Ray A. Dickie, Pleasant; Santokh S. Labana, Dearborn Heights, both of Mich.

[73] Assignee: Ford Motor Company, Dearborn, Mich.

[22] Filed: Dec. 21, 1970

[21] Appl. No.: 100,468

[52] U.S. Cl. ............260/836, 260/830 TW, 260/835
[51] Int. Cl. .....................................C08g 45/04
[58] Field of Search......260/831, 834, 836, 835, 859, 260/77.5 CR

[56] References Cited

UNITED STATES PATENTS

| | | | |
|---|---|---|---|
| 3,437,514 | 4/1969 | Burlant | 117/93.31 |
| 3,450,796 | 6/1969 | Griffin | 260/885 |
| 3,502,745 | 3/1970 | Minton | 260/881 |
| 3,528,844 | 9/1970 | Burlant | 260/881 |

*Primary Examiner*—Paul Lieberman
*Attorney*—John R. Faulkner and Olin B. Johnson

[57] ABSTRACT

Novel thermoset materials of improved impact, strength and fatigue properties are prepared from an alpha-beta olefinically unsaturated copolymer of vinyl monomers and a crosslinking amount of particulate graded-rubber having alpha-beta olefinicunsaturation surface functionality. The graded-rubber particles have a rubbery core and a glass-like polymeric shell.

13 Claims, No Drawings

RUBBER-MODIFIED ACRYLIC COPOLYMER THERMOSET

THE INVENTION

This invention is concerned with novel thermoset materials for molding and with the molded products thereof. The thermoset materials of this invention comprise an alpha-beta olefinically unsaturated copolymer of vinyl monomers and graded-rubber particles having alpha-beta olefinic-unsaturation surface functionality. Thermosets of this invention are compatible with conventional molding techniques, e.g., compression, injection, etc., and applicable to the production of structural materials as, for instance, automobile structural panels, electrical appliance housings, boat construction, conduits, etc.

I. The Copolymer of Vinyl Monomers

The alpha-beta olefinically unsaturated copolymer of vinyl monomers used herein advantageously have average molecular weight in the range of about 1,500 to about 25,000 preferably about 2,000 to about 15,000. The copolymer advantageously has between about 0.5 and about 5, preferably about 0.7 to about 3.5 units of alpha-beta olefinic unsaturation per 1,000 units molecular weight.

The vinyl copolymer used herein commonly consists essentially of carbon, hydrogen and oxygen. Suitable monomers for use in these copolymers include methyl methacrylate, hydroxyethyl methacrylate, hydroxypropyl methacrylate, ethyl methacrylate, phenyl methacrylate, benzyl methacrylate, isobornyl methacrylate, cyclohexyl methacrylate, butyl methacrylate, ethyl acrylate, ethyl chloroacrylate, styrene, butyl styrene, chlorostyrene, alpha-methyl styrene, allyl methacrylate, vinyl chloride, vinyl acetate, acrylonitrile, methacrylonitrile, methyl vinyl ether, diethyl fumarate, dimethyl itaconate and glycidyl methacrylate.

In a preferred embodiment, the copolymer has as constituent monomers methacrylonitrile, an ester of acrylic or methacrylic acid and a $C_1 - C_8$ monohydric alcohol, e.g., methyl methacrylate, and an epoxyacrylate, e.g., glycidyl methacrylate. The mixture of monomers is converted to the vinyl copolymer by any of the well known techniques of free radical or ionic polymerization methods. Free radical polymerization using azo type or peroxide type initiator is the preferred method for preparing the compositions described herein. Alpha-beta olefinic unsaturation is provided in this embodiment by subsequent reaction of an alpha-beta olefinically unsaturated monocarboxylic acid, e.g., acrylic acid, methacrylic acid, etc., with the epoxy groups provided by the epoxyacrylate. This unsaturation can also be provided by substituting the alpha-beta olefinically unsaturated monocarboxylic acid for the epoxy acrylate in the polymer-forming reaction and subsequently reacting the resultant free carboxyl groups with an epoxyacrylate. Other methods of preparing the copolymer of vinyl monomers are disclosed and illustrated in U.S. Pat. No. 3,528,844 to W. J. Burlant and C. R. Taylor.

II. Preparation of The Graded-Rubber Particles

The graded-rubber particle has a core of crosslinked, elastomeric, acrylic polymer, an outer shell comprising methyl methacrylate and a hydroxy-functional acrylate and an intermediate layer which is a copolymer of the monomers used to form the core and the monomers used to form the outer shell.

The process for preparing these particulate materials is at least a two-stage process. In one method of preparation, a major amount of mono-functional monoacrylate is emulsion copolymerized in the first stage with a crosslinking amount of a di- or tri- functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component i.e., a mixture of about 65 to about 98, preferably about 70 to about 95, mole percent methyl methacrylate, and about 2 to about 35, preferably about 5 to about 30 mole percent of an epoxy acrylate, e.g., glycidyl methacrylate, or about 2 to about 35 mole percent of the epoxy acrylate and about 65 to about 98 mole percent of a monomer mixture selected from and consisting essentially of esters of acrylic or methacrylic acid and a $C_1 - C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and additional surfactant may be added simultaneously with the second stage monomeric component. Alpha-beta olefinic unsaturation is introduced by reacting the epoxy groups provided by the epoxyacrylate with an alpha-beta olefinically unsaturated monocarboxylic acid, e.g., acrylic acid, methacrylic acid, etc.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20° – 30° C. The terms rubber-like and glass-like are, of course, meaningless except when used in reference to a specific temperature or temperature range. The particles should be formulated so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di- or tri- functional monomer containing two or more non-conjugated terminal ethylenic groups. The monofunctional, alkyl, monoacrylate is preferably an ester of a $C_2 - C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) or acrylic acid or a mixture of a major amount of the same and a minor amount of methacrylate.

Suitable crosslinking agents include, but not by way of limitation, 1,3 - butylene diacrylate, 1,3 - butylene dimethacrylate, divinyl benzene, 1,6 - hexamethylene diacrylate, 1,6 - hexamethylene diacrylate, 1,6 hexamethylene dimethacrylate, 1,1,1 - trimethylolethane triacrylate, 1,1,1 - trimethylolethane trimethacrylate, 1,1,1 - trimethylolpropane triacrylate, 1,1,1 - trimethylolpropane trimethacrylate, 1,4 - dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2 - C_8$, preferably $C_2 - C_6$, dihydric alcohol. In another embodiment, the crosslinking agent is a triester of acrylic or methacrylic acid and a $C_2 - C_8$, preferably $C_2 - C_6$, trihydric alcohol.

In the first reaction stage, there is preferably employed about 80 to about 98 mole percent of a monofunctional, monoacrylate and about 20 to about 2 mole percent of the cross-linking agent.

In the second stage reaction, it is preferred to use a mixture of about 65 to about 99, preferably about 70 to about 95 percent methyl methacrylate and about 1 to about 35, preferably about 5 to about 30, mole percent of hydroxyalkyl acrylate. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of monofunctional monoacrylates, e.g., esters of $C_2 - C_8$ monohydric alcohols and either acrylic or methacrylic acid, or monofunctional vinyl hydrocarbons such as styrene and methyl substituted styrenes, e.g., alpha methyl styrene. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2 - C_6$ dihydric alcohol, or divinyl hydrocarbon, e.g., 1 to 30 mole percent of divinyl benzene. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hydrophobic part, such as a hydrocarbon group containing eight or more carbon atoms, and a hydrophilic part, such as alkaline metal or ammonium carboxylate groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate, sodium oleate; sodium alkyl aryl sulfonates; polyoxyethylene sulfates and phosphates; the ethylene oxide condensate with long chain fatty acids, alcohols, and mercaptans and the alkali metal salts of rosin acids. These materials and techniques of employment of emulsion formation and maintenance are well known to the art and have no unusual application here. As they are conventional materials employed in a conventional manner, further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the polymer. Such chain transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded-rubber particles above described and this method of preparation are disclosed by Ray A. Dickie and Seymour Newman in their patent application Ser. No. 100,464 filed of even date with this application.

III. The Molding Composition

The molding composition exclusive of reinforcing fibers, particles, etc., commonly consists essentially of a major amount by weight of the alpha-beta olefinically unsaturated copolymer of vinyl monomers and a minor amount by weight of the graded-rubber particles. Vinyl monomers may be added to the composition to adjust the viscosity to a suitable level for the desired molding or processing technique. Nonreactive solvents may also be used in some embodiments to facilitate distribution of the rubber particles and subsequently removed under reduced pressure.

Any of the commonly available free radical catalysts such as azo compounds, peroxides and peresters may be used to effect cure during the molding process. In some cases, accelerators to enhance cure rate such as N,N-dimethyl toluidine, cobalt napthenate and benzoic sulfinimide may also be added in less than two percent amounts. In some cases, to provide stability at room temperature, and fast cure at elevated temperatures, accelerators may be used in combination with inhibitors such as 2,6 - ditertiary butyl phenol, hydroquinone, hydroquinone monomethyl ether in amounts less than one percent of the total.

The concentration of graded-rubber particles homogeneously dispersed in the final product can be varied over a wide range in conformance with the properties desired for such product. Thus, it may be advisable in certain instances for this concentration to range upward from a minimum modifying amount to a major fraction by weight. In the main, however, the concentration and composition of the graded-rubber particles will be such that the elastomeric cores will comprise a minor proportion by weight of the final product, commonly between about 5 to about 40, more commonly between about 10 and about 30, weight percent of the final product. The weight relationship of the glass-like outer shell to the elastomeric core can be varied but for most purposes the weight of the outer shell will not substantially exceed that of the core. In most instances, the average weights of the outer shells will be about 10 to about 60, preferably about 20 to about 50, percent of the average weight of the cores.

This invention will be more fully understood from the following examples which illustrate the thermoset materials hereinbefore described and hereinafter claimed.

EXAMPLE 1

An acrylic prepolymer is prepared by slowly adding a mixture of 60.0 parts by weight glycidyl methacrylate, 140.0 parts by weight methyl methacrylate, and 4.0 parts by weight 2,2' azobis (2 - methyl-propionitrile), to 200 parts by weight rapidly stirred toluene maintained at reflux temperature under a nitrogen atmosphere. Upon completion of the addition, 0.2 parts by weight 2,2' - azobis (2 - methylpropionitrile) dissolved in 25 parts by weight toluene is added over a thirty minute period. The reaction mixture is maintained at 110° C. for an additional two hours. The reaction mixture is then cooled to below 50° C. and there is added 34 parts by weight methacrylic acid, 1.5 parts by weight benzyl triethyl ammonium chloride, and 0.2 parts by weight hydroquinone. The mixture is stirred at 85° C. for several hours until titration shown more than 95 percent of the methacrylic acid reacted and infrared analysis shows more than 95 percent of the glycidyl group consumed. The reaction mixture is cooled, diluted with toluene to 30 percent solids, and coagulated in 5 to 7 volumes of hexane. The resultant white powder hereinafter referred to as Powder B is dried in vacuo for 4 hours at 60° C.

About 70 parts by weight of epoxy-functional rubber particles, hereinafter termed Powder A, are dissolved in 150 parts by weight acetone. To this solution is added methacrylic acid in an amount providing about one carboxyl group per each epoxy group in the outer shells of the rubber particles. To the mixture is added a catalytic amount (1.5 parts by weight) benzyl triethyl ammonium chloride. The dispersion is heated until reaction between the methacrylic acid and the epoxy groups on the graded-rubber particles is substantially complete. The rubber particles are separated from the acetone, dried, and dispersed in 150 parts by weight methyl methacrylate. To this dispersion are added 200 parts by weight of the unsaturated acrylic prepolymer above termed Powder B and a catalytic amount (0.1 percent by weight) di- t-butyl peroxide. The dispersion is compression molded at 100° C. for 15 minutes to yield a hard article insoluble in acetone. By comparison, this mold is much tougher than an identically prepared mold which omits the graded elastomeric particles.

Powder A employed above is prepared in the following manner: To 1,000 parts by weight water which has been boiled and cooled to room temperature under a nitrogen atmosphere are added 2.86 parts by weight sodium dodecyl sulfate dissolved in 35.7 parts by weight water and about 1/6 of a monomer mixture consisting of 348 parts by weight butyl acrylate and 32.3 parts by weight 1,3 - butylene dimethacrylate. The mixture is stirred to establish dispersion of the monomers. To the stirred mixture are added 3.14 parts by weight potassium persulfate dissolved in 71.4 parts by weight water. The mixture is heated to 45° C. After about 10 minutes, addition of the remainder of the first monomer mixture is begun at a rate such that the temperature of the reaction mixture is maintained at 47° to 49° C. The last half of the first monomer mixture is added simultaneously with 2.86 parts by weight of sodium dodecyl sulfate dissolved in 35.7 parts by weight water. Addition of the first monomer mixture requires about 45 minutes. The reaction mixture is maintained at 47° to 49° C. for 35 minutes prior to beginning simultaneous dropwise addition of (1) a mixture of 236 parts by weight methyl methacrylate, 143.4 parts by weight glycidyl methacrylate, and 2.57 parts by weight 1 - dodecanethiol, and (2) a solution of 5.72 parts by weight sodium dodecyl sulfate in 35.7 parts by weight water. This addition, which requires about 40 minutes, is carried out at such a rate that the temperature of the reaction mixture is maintained at 47 to 49° C. Following this addition, the mixture is maintained at 47 to 49° C. for an additional 2 hours. The resulting latex, which may be termed Latex A, is cooled to room temperature and neutralized with aqueous ammonia. The overall conversion of monomers is about 98 percent. The average size of these particles is in the range of 0.1 to 0.2 micron. Latex A is coagulated by adding one volume of latex to approximately 4 volumes of methyl alcohol to which has been added 0.001 volume concentrated hydrochloric acid. The coagulum is isolated by filtration, washed with several volumes of methyl alcohol, and with water, and is dried in vacuo to yield Powder A.

EXAMPLE 2

The procedures of Example 1 are repeated with the difference that Powder C is replaced by a prepolymer prepared in the following way: A mixture of 70 parts by weight glycidyl methacrylate, 90 parts by weight methyl methacrylate, 40 parts by weight methacrylonitrile, and 4 parts by weight 2,2' - azobis - (2 - methylpropionitrile) is added slowly to a refluxing mixture of 150 parts by weight toluene and 150 parts by weight dioxane under a nitrogen atmosphere. The prepolymer obtained is reacted with 45 parts by weight methacrylic acid using 1.5 parts by weight benzyl triethyl ammonium chloride as catalyst in the presence of 0.2 parts by weight hydroquinone. Upon completion of this reaction, the mixture is diluted with acetone to 30 percent by weight solids and is coagulated in 5 to 7 volumes of hexane. The resultant white powder hereinafter referred to as Powder C is dried in vacuo at 60° C. for 4 hours.

Upon substitution of Powder C for Powder B in Example 1, a hard molded article is obtained which is insoluble in acetone or toluene. By comparison, the molded piece is much tougher than an identically prepared molded piece which omits the graded-rubber particles.

EXAMPLE 3

The procedures of Examples 1 to 2 are repeated with the difference that an equimolar amount of acrylic acid is substituted for methacrylic acid in the reaction with the epoxy groups on the surfaces of the graded-rubber particles.

EXAMPLE 4

Another thermoset is prepared with incorporation of the graded-rubber particles in the following manner: Sixty parts by weight glycidyl methacrylate, 140 parts by weight methyl methacrylate, 4 parts by weight 2,2' - azobis - (2 - methylpropionitrile), and six parts by weight 1 - dodecanethiol are mixed and added to 600 parts by weight water (freshly boiled to remove dissolved oxygen and cooled to room temperature under a nitrogen atmosphere) which contains 1.8 parts by weight polyvinyl alcohol) and 18 parts by weight sodium chloride.

The mixture is stirred vigorously and gently heated to 50° C. When an exothermic reaction is observed, external heating is discontinued. The reaction mixture is maintained at 60° C. for 3 hours. The polymer thus obtained is filtered, washed with methyl alcohol, and dried in vacuo at 60° C. for 6 hours.

One hundred-ninety parts by weight of the powder obtained is mixed with 150 parts by weight methyl methacrylate, 140 parts by weight Powder A (epoxy-functional rubber particles), sufficient methacrylic acid to provide about one acid functionality per each epoxy group in the mixture, one part by weight benzyl triethyl ammonium chloride, and 0.2 parts by weight hydroquinone. Dispersion of the rubber particles is achieved by blending with a Brabender mixer equipped with sigma blades. The mixture is heated to 80° C. until the reaction between acid groups and glycidyl groups is substantially complete. One weight percent di- t-butyl perbenzoate is added and the mixture is compression molded for 15 minutes at 100° C. to yield a hard molded article which is insoluble in acetone.

EXAMPLE 5

The procedures of Example 4 are repeated with the difference that the thermoset prepolymer is formed from a monomer mixture comprising 30 mole percent glycidyl methacrylate, 30 mole percent methacrylonitrile, and 40 mole percent methyl methacrylate.

EXAMPLE 6

The procedures of Examples 1 – 5 are repeated with the difference that the dispersion of prepolymer, methyl methacrylate, and graded-rubber particles is diluted with methyl methacrylate until the total concentration of unreacted methyl methacrylate is 40 weight percent. This material is sprayed on wood, metal, and polymeric substrates and crosslinked thereon by exposing the resultant coating to an electron beam having average energy of about 95,000 electron volts in a nitrogen atmosphere.

EXAMPLE 7

An acrylic prepolymer is prepared by slowly adding a mixture of 86 parts by weight of methacrylic acid, 814 parts by weight of methyl methacrylate, 100 parts by weight of methacrylonitrile and 20 parts by weight of 2,2' - azobis (2 - methylpropionitrile) to 1,000 parts by weight of rapidly stirred toluene maintained at reflux temperature under a nitrogen atmosphere. Upon completion of the addition, 2.0 parts by weight of 2,2' - azobis (2 - methylpropionitrile) dissolved in 40 parts by weight of toluene is added over a period of 30 minutes. The mixture is maintained at 110° C. for an additional 2 hours.

The reaction mixture is cooled to 50° C., and there is added 142 parts by weight of glycidyl methacrylate, 5 parts by weight of 2,6 - ditertiary butyl phenol and 5 parts by weight of trimethylbenzylammonium iodide. The mixture is heated at 85° C. for several hours until 95 percent of the glycidyl group, as shown by infrared, is reacted. The prepolymer is coagulated, mixed with graded-rubber particles and molded.

EXAMPLE 8

The procedure of Example 7 is repeated except for the difference of using 43 parts by weight of methacrylic acid and 72 parts by weight of glycidyl methacrylate.

EXAMPLE 9

The procedure of Example 7 is repeated except for the difference of using 36 parts by weight acrylic acid instead of the methacrylic acid and 72 parts by weight of the glycidyl methacrylate.

EXAMPLE 10

The procedure of Example 7 is repeated except for the difference of using 350 parts by weight methacrylic acid and 570 parts by weight of glycidyl methacrylate.

EXAMPLE 11

The procedure of Example 1 is repeated except for the difference of using 142 parts by weight of glycidyl methacrylate and 86 parts by weight of methacrylic acid.

EXAMPLE 12

The procedure of Example 1 is repeated except for the difference of using 28 parts by weight of glycidyl methacrylate and 18 parts by weight of methacrylic acid.

The terms "acrylate" and "acrylates," when used herein without a modifier distinguishing between esters of acrylic and methacrylic acid, shall be understood to include both. This, of course, does not apply to the naming of a specific compound.

The foregoing examples are illustrative of the invention defined in the amended claims. Those skilled in the art will be aware that modifications may be made therein without departing from the scope of the invention as set forth in the appended claims.

We claim:

1. A thermoset product molded from (A) about 60 to about 95 parts by weight of an alpha-beta, olefinically-unsaturated, copolymer of monovinyl monomers consisting essentially of carbon, hydrogen and oxygen, having average molecular weight between about 1,000 and about 25,000 and containing between about 0.5 and about 5 units of alpha-beta olefinic unsaturation per 1,000 units molecular weight, said copolymer of monovinyl monomers having a alpha-beta olefinic unsaturation pendant from its principal carbon-to-carbon chain through an ester linkage and being the polymeric product formed by reacting carboxyl of an alpha-beta olefinically unsaturated monocarboxylic acid with epoxide of an addition copolymer of monovinyl monomers of which at least one constituent monomer is an epoxy-functional acrylate or methacrylate, and (B) a crosslinking amount of about 5 to about 40 parts by weight of graded-rubber particles having alpha-beta olefinic-unsaturation, surface functionality and crosslinked through the olefinic unsaturation of said copolymer of monovinyl monomers and the olefinic unsaturation of said graded-rubber particles, said graded-rubber particles consisting essentially of
   1. about 10 to about 90 weight percent of a core of crosslinked acrylic polymer consisting essentially of
      a. a minor and crosslinking amount of a di- or trifunctional monomer containing 2 or more nonconjugated terminal ethylenic groups, said minor and crosslinking amount not exceeding about 20 mole percent of the core reactants, and
      b. a remainder consisting essentially of a monofunctional monoacrylate, said remainder constituting at a minimum about 80 mole percent of the core reactants, and
   2. about 90 to about 10 weight percent of an outer shell having glass transition temperature above that of said core and consisting essentially of the polymerization product of monomer mixtures selected from the group consisting of
      a. about 65 to about 98 mole percent methyl methacrylate and about 2 to about 35 mole percent of an epoxy-functional acrylate, and
      b. about 2 to about 35 mole percent of an epoxy-functional acrylate and about 65 to about 98 mole percent of a mixture consisting essentially of esters of acrylic or methacrylic acid and a $C_1 - C_8$ monohydric alcohol, $C_8 - C_9$ monovinyl hydrocarbons, 0 to 30 mole percent of a difunctional compound selected from the group consisting of divinyl benzene and diesters of acrylic or methacrylic acid and a $C_2 - C_6$ dihydric alcohol and 0 to 30 mole percent of a monomer selected from acrylonitrile, methacrylonitrile and vinyl acetate,
      and being provided with alpha-beta olefinic-unsaturation, surface functionality by reacting resultant epoxy groups on the surfaces of said outer shell with an alpha-beta olefinically unsaturated monocarboxylic acid.

2. A thermoset produce molded from (A) about 70 to about 90 parts by weight of an alpha-beta, olefinically-unsaturated, copolymer of monovinyl monomers consisting essentially of carbon, hydrogen and oxygen, having average molecular weight between about 1,000 and about 25,000 and containing between about 0.5 and about 5 units of alpha-beta olefinic unsaturation per 1,000 units molecular weight, said copolymer of monovinyl monomers having alpha-beta olefinic unsaturation pendant from its principal carbon-to-carbon chain through an ester linkage and being the polymeric product formed by reacting carboxyl of an alpha-beta olefinically unsaturated monocarboxylic acid with epoxide of an addition copolymer of monovinyl monomers of which at least one constituent monomer is an epoxy-functional acrylate or methacrylate, and (B) a crosslinking amount about 10 to about 30 parts by weight of graded-rubber particles having alpha-beta olefinic-unsaturation, surface functionality and crosslinked through the olefinic unsaturation of said copolymer of monovinyl monomers and the olefinic unsaturation of said graded-rubber particles, said graded-rubber particles consisting essentially of
   1. about 10 to about 90 weight percent of a core of crosslinked acrylic polymer consisting essentially of
      a. a minor and crosslinking amount of a di- or trifunctional monomer selected from the group consisting of divinyl benzene, diesters of acrylic or methacrylic acid and a $C_2 - C_8$ dihydric alcohol, and triesters of acrylic or methacrylic acid and a $C_2 - C_8$ trihydric alcohol, said minor and crosslinking amount not exceeding about 20 mole percent of the core reactants and
      b. a remainder consisting essentially of a monofunctional monoacrylate, said remainder constituting at a minimum about 80 mole percent of the core reactants, and
   2. about 90 to about 10 weight percent of an outer shell having glass transition temperature above that of said core and consisting essentially of the polymerization product of monomer mixtures selected from the group consisting of
      a. about 65 to about 98 mole percent methyl methacrylate and about 2 to about 35 mole percent of an epoxy-functional acrylate, and
      b. about 2 to about 35 mole percent of an epoxy-functional acrylate and about 65 to about 98 mole percent of a mixture consisting essentially of esters of acrylic or methacrylic acid and a $C_1 - C_8$ monohydric alcohol, $C_8 - C_9$ monovinyl hydrocarbons, 0 to 30 mole percent of a difunctional compound selected from the group consisting of divinyl benzene and diesters of acrylic or methacrylic acid and a $C_2 - C_6$ dihydric alcohol and 0 to 30 mole percent of a monomer selected from acrylonitrile, methacrylonitrile and vinyl acetate,
      and being provided with alpha-beta olefinic-unsaturation, surface functionality by reacting resultant epoxy groups on the surfaces of said outer shell with an alpha-beta olefinically unsaturated monocarboxylic acid.

3. A thermoset product in accordance with claim 2 wherein said alpha-beta olefinically unsaturated monocarboxylic acid is acrylic acid.

4. A thermoset product in accordance with claim 2 wherein said alpha-beta olefinically unsaturated monocarboxylic acid is methacrylic acid.

5. A thermoset product in accordance with claim 2 wherein said outer shell has glass transition temperature at least 50° C. above that of said core.

6. A thermoset product in accordance with claim 2 wherein said major amount is about 80 to about 98 mole percent and said minor and crosslinking amount is about 2 to about 20 mole percent.

7. A thermoset product in accordance with claim 2 wherein said copolymer of vinyl monomers has average molecular weight in the range of 2,000 to about 15,000.

8. A thermoset product in accordance with claim 2 wherein said copolymer of vinyl monomers contains between about 0.7 and about 3.5 units of alpha-beta olefinic unsaturation per 1,000 units molecular weight.

9. A thermoset product molded from (A) about 70 to about 90 parts by weight of an alpha-beta olefinically-unsaturated copolymer of monovinyl monomers consisting essentially of carbon, hydrogen and oxygen, having average molecular weight between about 2,000 and about 15,000 and containing about 0.7 to about 3.5 units of alpha-beta olefinic unsaturation per 1,000 units molecular weight, said copolymer of monovinyl monomers having alpha-beta olefinic unsaturation pendant from its principal carbon-to-carbon chain through an ester linkage and being the polymeric product formed by reacting carboxyl of an alpha-beta olefinically unsaturated monocarboxylic acid with epoxide of an addition copolymer of monovinyl monomers of which at least one constituent monomer is an epoxy-functional acrylate or methacrylate, and (B) a crosslinking amount of about 10 to about 30 parts by weight of graded-rubber particles having alpha-beta olefinic-unsaturation, surface functionality and crosslinked through the olefinic unsaturation of said copolymer of monovinyl monomers and the olefinic unsaturation of said graded-rubber particles, said graded-rubber particles consisting essentially of
1. between 10 and 90 weight percent of a core of crosslinked acrylic polymer consisting essentially of
   a. a minor and crosslinking amount of a di- or tri-functional monomer selected from the group consisting of divinyl benzene, diesters of acrylic or methacrylic acid and a $C_2 - C_6$ dihydric alcohol and triesters of acrylic or methacrylic acid and a $C_2 - C_8$ trihydric alcohol, said minor and crosslinking amount not exceeding about 20 mole percent of the core reactants and
   b. a remainder consisting essentially of a monofunctional monoacrylate, said remainder constituting at a minimum about 80 mole percent of the core reactants, and
2. between 90 and 10 weight percent of an outer shell having glass transition temperature above that of said core and consisting essentially of the polymerization product of monomer mixtures selected from the group consisting of
   a. about 65 to about 98 mole percent methyl methacrylate and about 2 to about 35 mole percent of an epoxy-functional acrylate, and
   b. about 2 to about 35 mole percent of an epoxy-functional acrylate and about 65 to about 98 mole percent of a mixture consisting essentially of esters of acrylic or methacrylic acid and a $C_1 - C_8$ monohydric alcohol, $C_8 - C_9$ monovinyl hydrocarbons, 0 to 30 mole percent of a monomer selected from acrylonitrile, methacrylonitrile and vinyl acetate, and being provided with alpha-beta olefinic-unsaturation, surface functionality by reacting resultant epoxy groups on the surfaces of said outer shell with an alpha-beta olefinically-unsaturated monocarboxylic acid, and being further characterized in that the average weight of the outer shells of said graded-rubber particles is between about 10 and about 60 percent of the average weight of the cores of the same.

10. A thermoset product in accordance with claim 9 wherein said copolymer of vinyl monomers is a copolymer of glycidyl methacrylate and an ester of acrylic or methacrylic acid and a $C_1 - C_8$ monohydric alcohol which has been reacted with acrylic or methacrylic acid.

11. A thermoset product in accordance with claim 9 wherein said copolymer of vinyl monomers is a copolymer of glycidyl methacrylate, an ester of acrylic or methacrylic acid and a $C_1 - C_8$ monohydric alcohol, and methacrylonitrile which has been reacted with acrylic or methacrylic acid.

12. A thermoset product in accordance with claim 9 wherein said copolymer of vinyl monomers is a copolymer of acrylic or methacrylic acid and methacrylonitrile which has been reacted with glycidyl methacrylate.

13. A thermoset product in accordance with claim 9 wherein said particles of graded rubber have average diameter in the range of 0.04 to 1. micron.

* * * * *